United States Patent [19]
Brown

[11] Patent Number: 5,506,891
[45] Date of Patent: Apr. 9, 1996

[54] METHOD AND APPARATUS FOR DETECTING THE CONNECTION STATUS OF AN EXTENSION PHONE CONNECTED TO A VOICE/FAX/DATA MODEM

[75] Inventor: Paul M. Brown, Morgan Hill, Calif.

[73] Assignee: Cirrus Logic, Inc., Fremont, Calif.

[21] Appl. No.: 454,405

[22] Filed: May 30, 1995

Related U.S. Application Data

[63] Continuation of Ser. No. 88,203, Jul. 6, 1993, abandoned.

[51] Int. Cl.$^6$ .................................................. H04M 11/00
[52] U.S. Cl. ............................ 379/97; 379/377; 379/385
[58] Field of Search ............................... 379/93, 96–100, 379/102, 106, 107, 161, 164, 377, 381–383, 385–387, 105

[56] References Cited

U.S. PATENT DOCUMENTS

| | | | |
|---|---|---|---|
| 4,446,338 | 5/1984 | Rosch | 379/383 |
| 4,525,603 | 6/1985 | Bond | 379/377 |
| 4,654,869 | 3/1987 | Smith et al. | 379/93 |
| 4,696,031 | 9/1987 | Freudberg et al. | 379/97 |
| 4,802,207 | 1/1989 | Uchida | 379/377 |
| 4,811,389 | 3/1989 | Balch | 379/107 |
| 4,837,797 | 6/1989 | Freeny, Jr. | 379/96 |
| 4,958,371 | 9/1990 | Damoci et al. | 379/377 |
| 5,311,588 | 5/1994 | Polcyn et al. | 379/382 |

FOREIGN PATENT DOCUMENTS 2183427 6/1987 United Kingdom ................... 379/105

Primary Examiner—Wing F. Chan
Attorney, Agent, or Firm—Blakely, Sokoloff, Taylor and Zafman

[57] ABSTRACT

A detector circuit is provided for detecting the off-hook status of the extension telephone line. The detector is connected to tip and ring lines of the telephone line for determining a change in the voltage between the tip and ring lines. The detector includes a low pass filter for filtering noise and AC signals. The filtered signals are transmitted through a converter which converts a differential voltage between the signals into an absolute voltage relative to a ground. A pair of voltage peak detectors generate output signals in response to changes in the absolute voltage. A first peak detector provides a quickly varying output signal representing an instantaneous voltage. The second peak detector provides a slowly varying output response representative of an average voltage over a period of time. The average voltage is employed as a reference voltage against which the instantaneous voltage is compared. If a substantial difference between the instantaneous voltage and the average voltage is detected, a logic output signal is generated which indicates that an extension line is off-hook. In one embodiment, the detector circuit is employed as a component of a voice/data/fax modem. The modem responds to the detection of the off-hook extension line by deactivating a voice answering machine cycle. Further method and apparatus embodiments of the invention are described.

18 Claims, 4 Drawing Sheets

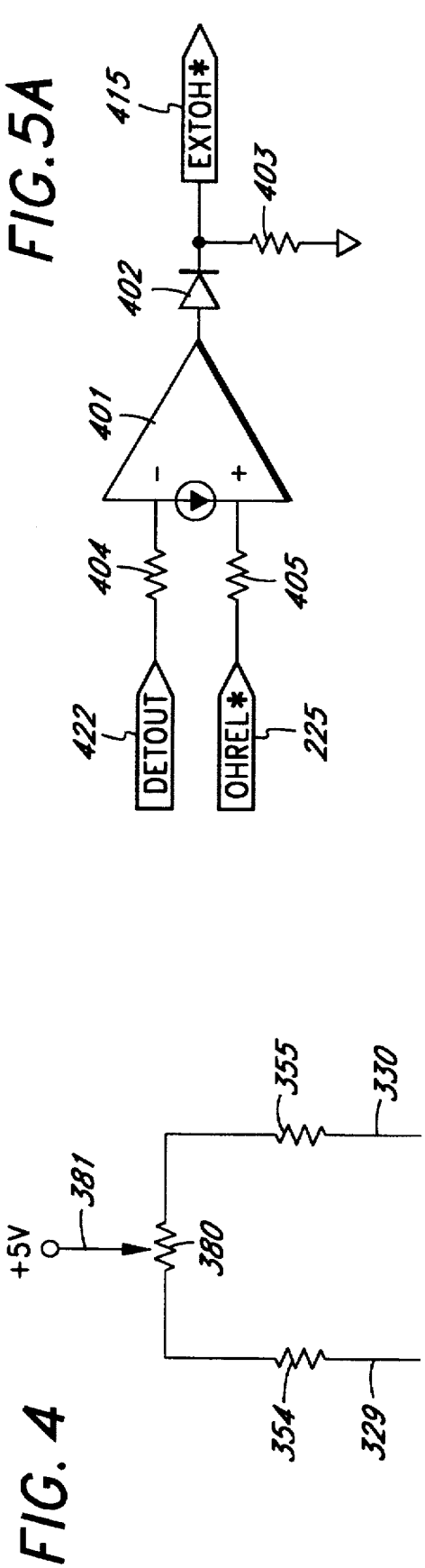
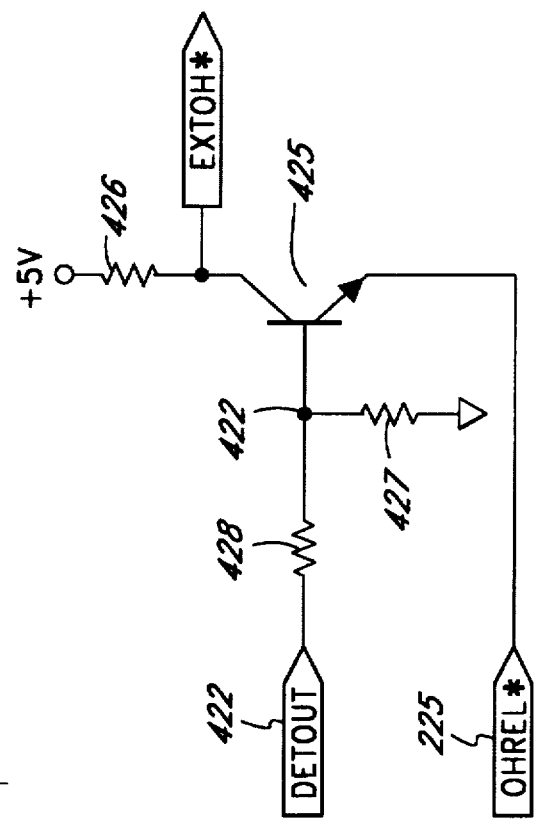
FIG. 5A
FIG. 5B
FIG. 4

METHOD AND APPARATUS FOR DETECTING THE CONNECTION STATUS OF AN EXTENSION PHONE CONNECTED TO A VOICE/FAX/DATA MODEM

This is a continuation of application Ser. No. 08/088,203 filed Jul. 6, 1993 now abandoned.

BACKGROUND OF THE INVENTION

1. Field of the Invention

The present invention generally relates to devices for automatically answering telephone calls such as facsimile machines, modems, answering machines, and the like, and more particularly relates to a device for detecting the connection status of an extension phone connected to one of such automatic telephone call answering devices.

2. Description of Related Art

A variety of devices have been developed for automatically answering incoming telephone calls received from a public switched telephone network (PSTN) and for automatically recording messages or data received in the incoming telephone call. Examples include conventional facsimile machines, data modems, answering machines and the like. Recently, integrated devices have been developed which provide for all of the above functions. Once such device is a data/fax/voice modem, which is typically employed in connection with a host computer. The data/fax/voice modem automatically answers an incoming telephone call received along a telephone line connected to the PSTN. The data/fax/voice modem then determines whether the received telephone call includes a data message, a facsimile message, or an ordinary voice message. If the incoming message is a data message, a data modem module of the data/fax/voice modem operates to receive and decode the data message for storage in a computer memory of the host computer, typically within a hard disk drive memory device. If the incoming message is a facsimile message, a fax module of the data/fax/voice modem operates to receive and decode the facsimile image for storage within the memory of the host computer. Alternatively, a facsimile print-out device may be connected to the data/fax/voice modem for automatically printing the facsimile image, thus eliminating the need to store the facsimile image within the host computer. If the incoming message is a voice message, an answering machine module of the data/fax/voice modem operates to answer the incoming voice communication. In particular, the answering machine module of the data/fax/voice modem initially outputs a prerecorded greeting then records a voice message in response to the greeting. Digital-to-analog converter means may be included within the data/fax/voice modem for converting the incoming voice message to digital signals for storing in the memory of the host computer. Alternatively, the data/fax/voice modem may be connected to a conventional analog recording device such as a tape recorder for recording the voice message. As can be appreciated, a variety of implementations and configurations are available.

Although the data/fax/voice modem provides a convenient tool for answering incoming telephone calls and storing data, fax or voice messages accordingly, a problem can occur when an operator attempts to manually answer the incoming telephone call using an extension line after operation of the data/fax/voice modem has commenced. In particular, if the incoming message is a voice message, an operator may wish to override the automatic answering machine operation of the data/fax/voice modem and answer the telephone call directly. However, with typical data/fax/voice modems, once the modem has answered the telephone call and begins recording a message in response thereto, the answering machine operation of the modem cannot be conveniently terminated. Usually, termination requires manually deactivating the modem by pressing appropriate buttons on the modem itself or by entering commands into the host computer. At best, the need to manually deactivate the data/fax/voice modem is inconvenient. However, where the modem or host computer is remote from the location of the operator, it may be difficult, or at least highly frustrating, for the operator to manually deactivate the modem.

This problem, although described with reference to a data/fax/voice modem, can occur in any circumstance where a device automatically answers an incoming telephone call. In such circumstances, it would be desirable to allow an operator to disable the modem or other telephone answering device, by merely picking up the telephone call through the extension line. Hence, it would be desirable to provide a mechanism for detecting the off-hook status of an extension line for possible use in controlling operation of the modem or other telephone answering device.

SUMMARY OF THE INVENTION

For the foregoing, it can be appreciated that it would be desirable to provide a mechanism for detecting the off-hook status of an extension line, and, in particular, to provide such a mechanism in combination with an automatic telephone answering device for use in deactivating the device if an incoming telephone call is answered via an extension line. One general objective of the invention is to provide such a device for detecting the off-hook status of an extension line. It is a further object to provide a data/fax/voice modem system having such a mechanism.

These and other general objects of the invention are achieved by the provision of a device for answering a telephone call received along a telephone line, having at least one extension line, with the device comprising:

means, connected to the telephone line, for answering an incoming telephone call received along the telephone line;

means for determining whether the incoming call contains a data message or a voice message;

means for recording a portion of the voice message in response to a determination that the incoming call contains a voice message;

means for detecting an off-hook condition of the extension line; and means, operative in response to the detection of an off-hook condition, for controlling operation of the means for recording the voice message.

In a preferred embodiment, the device includes a data/fax/voice modem connected to a host computer having a memory. An incoming voice message, as well as data messages and facsimile messages, are stored within the memory of the host computer.

Also in accordance with the invention, a device for detecting an off-hook condition of an extension line, connected to a telephone line having tip and ring lines is provided. The device includes:

converter means, for converting a voltage difference between the tip and ring lines into an absolute voltage signal relative to a ground;

first voltage detection means for generating a signal representative of an average voltage, said first voltage detection means having a slowly-varying response;

second voltage detection means for generating a signal representative of a current voltage, said second voltage detection means having a quickly-varying response; and means for comparing the signals representative of the current voltage and the average voltage and for detecting a difference between the current voltage and the average voltage.

Hence, a device is provided which operates to detect the off-hook condition of an extension line by detecting a change in voltage along the tip and ring lines. The change in voltage is determined by comparing a current or substantially instantaneous voltage with an average voltage. The change in the voltage occurs, in part, because an extension line, when taken off-hook, consumes additional current from the telephone line.

Preferably, the device for detecting the off-hook condition of the extension line is used in connection with a voice/data/fax modem or similar device. A logic signal is transmitted to the voice/data/fax modem from the device for detecting the off-hook condition of the extension line for use in controlling operation of the modem. For example, the voice/data/fax modem may be configured to respond to the signal by deactivating an answering machine module of the modem to allow an operator to converse directly with the party initiating the telephone call via the extension line. Also, preferably, the modem is configured to ignore the signal if an incoming message is a data message or a facsimile message such that the receipt and storage of a data or facsimile message is not disrupted by the off-hook extension line.

Also in accordance with the invention, a method for answering a telephone call received along a telephone line having at least one extension line is provided. The method comprises the steps of:

answering an incoming telephone call received along the telephone lines;

determining whether the incoming call contains a data message or a voice message;

recording at least a portion of the voice message in response to a determination that the incoming call contained the voice message;

detecting an off-hook condition on the extension line; and controlling the recording of the voice message in response to the detection of an off-hook condition of the extension line.

Also in accordance with the invention, a method for detecting the off-hook status of an extension line, connected to a telephone line, having tip and ring lines is provided. The method comprises the steps of:

converting a voltage difference between the tip and ring lines of the telephone line into an absolute voltage signal relative to a ground;

generating a first signal representative of an average of the absolute voltage signal;

generating a second signal representative of a current level of the absolute voltage signal;

comparing the signals representative of the current voltage and the average voltage; and detecting any difference between the current voltage and the average voltage.

In its various embodiments, the invention provides a useful tool for detecting whether an extension line has been taken off-hook. As noted, the detection of the off-hook status of the extension line is preferably used in connection with a voice/data/fax modem for deactivating a voice message recording module of the modem to allow an operator to speak directly with a calling party. However, the detection of the off-hook status of the extension line may be employed in connection with other devices as well, such as with answering machine-only devices.

Accordingly, general objects of the invention set forth above are achieved. Other objects and advantages of the invention will be apparent from the detailed description of the invention set forth below.

BRIEF DESCRIPTION OF THE DRAWINGS

The novel features of this invention, as well as the invention itself, both as to its structure and its operation will be best understood from the accompanying drawings, taken in conjunction with the accompanying description, in which similar reference characters refer to similar parts, and in which:

FIG. 4 is a schematic illustration of an alternate embodiment for a voltage converter element of the device of FIG. 2.

FIG. 5a is a schematic illustration of an alternate embodiment of a NAND-gate circuit of the device of FIG. 2.

FIG. 5b is another alternative embodiment of the NAND gate circuit of FIG. 2.

DESCRIPTION OF THE PREFERRED EMBODIMENTS

Figure 1:
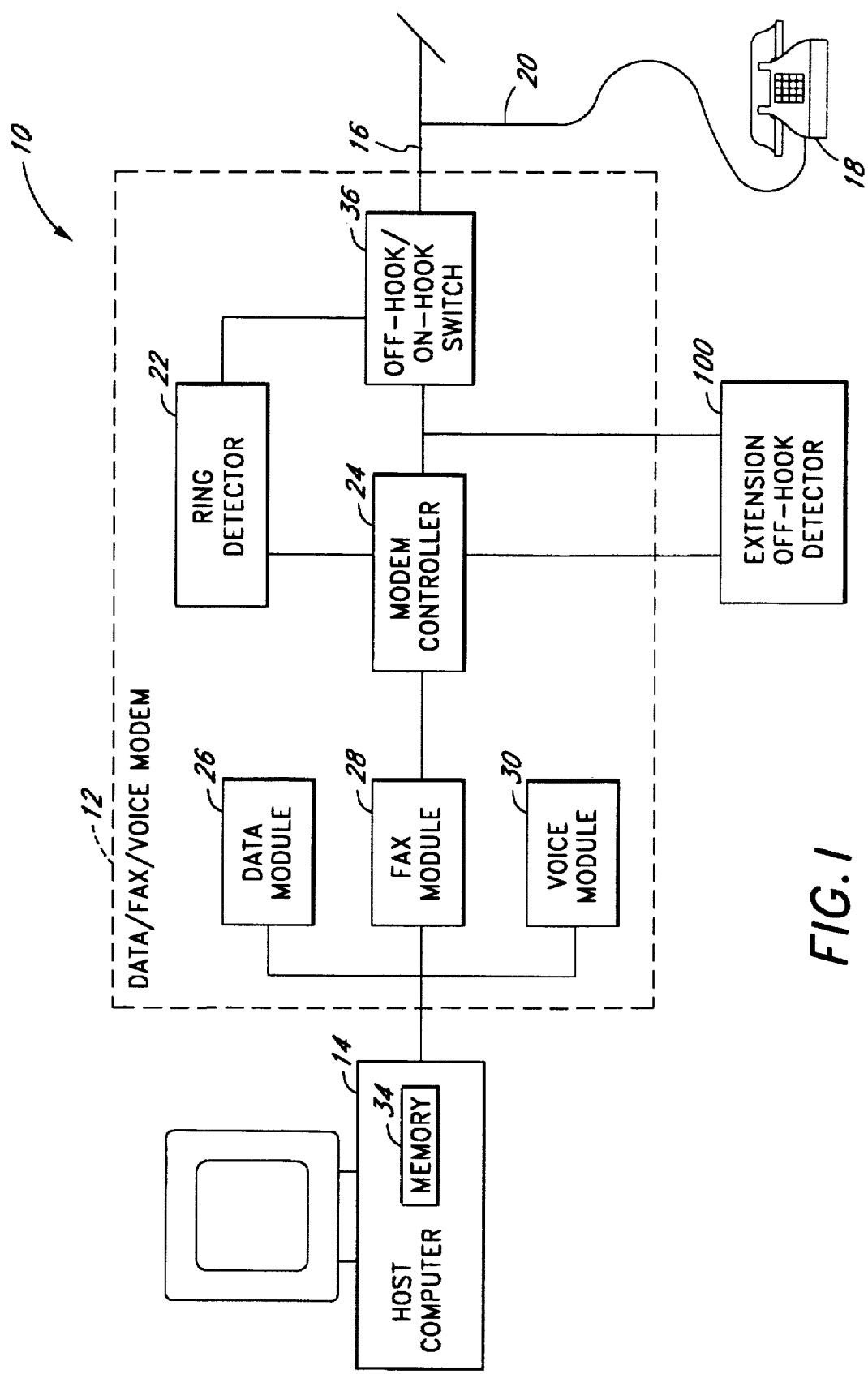
FIG. 1 is a block diagram illustrating a voice/data/fax modem connected to a host computer with a device for detecting an off-hook status of an extension telephone line operably connected to the modem.

Referring to FIGS. 1–5, preferred and alternative embodiments of the invention will now be described. FIG. 1 provides a functional overview of a telephone answering system configured in accordance with a preferred embodiment of the invention. Answering system 10 includes a voice/data/fax modem 12 connected to a host computer 14. Modem 12 receives incoming telephone calls along a telephone line 16. A telephone 18 is connected to telephone line 16 via an extension line 20. Although not shown, telephone line 16 is connected to a PSTN common carrier telephone system.

Modem 12 includes a ring detector 22 for detecting an incoming telephone call along telephone line 16, a controller 24 for determining a type of message received along telephone line 16, and a set of three individual message handling modules—a data module 26, a fax module 28 and a voice module 30. An off-hook detector 100 for detecting whether extension line 20 is taken off-hook by an operator manually answering telephone 18 is connected to modem 12. Answering system 10 may alternatively be configured with off-hook detector 100 being a portion of modem 12 rather than a separate component. Host computer 14 includes a computer memory 34 which may be a hard disk drive.

In use, the ring signal of an incoming telephone call is detected by ring detector 22 which operates to control a switch mechanism 36 for taking telephone line 16 off-hook to allow the telephone call to be answered. Once telephone line 16 is off-hook, controller 24 determines whether an incoming telephone message provides a data message, a facsimile message or a voice message. If the incoming message is a data message, data module 26 operates to receive and decode the data message for output to computer 14 where the message is stored within memory 34. If the incoming message is a facsimile message, facsimile module 26 operates to receive and decode the incoming message and outputs the message to computer 14 for storage in memory 34. Finally, if the incoming message is a voice message, voice module 30 is activated. Voice module 30 operates as an answering machine for transmitting a prerecorded greeting onto telephone line 16 and for receiving a voice message in response thereto. The voice message is transmitted to host 14 for storage in digital form within memory 34. In this regard, data module 30 may include one or more analog-to-digital converters for converting an incoming analog voice message to digital form for storage within memory 34.

Although not shown, modem 12 may include a speaker unit for providing audible playback of the greeting, incoming message, or any other desired sounds.

Off-hook detector 100 operates to detect whether extension line 20 is taken off-hook by manual pick-up of telephone 18 (or by automatic pick-up by another automatic telephone answering device, not shown, connected to the extension line.) Off-hook detector 100 generates a logical signal for transmission to controller 24 in response to a detection of the extension line being taken off-hook. If modem 12 is in the process of receiving and storing a data message or a facsimile message, the logic signal is ignored. If, however, modem 12 is in the processes of receiving a voice message, controller 24 responds to the logic signal by deactivating voice module 30 to terminate the answering machine functions of voice module 30, thereby allowing an operator who has picked up telephone 18 to speak directly to the calling party. In this manner, the operator need not wait until voice module 30 has completed an answering machine cycle.

Figure 2:
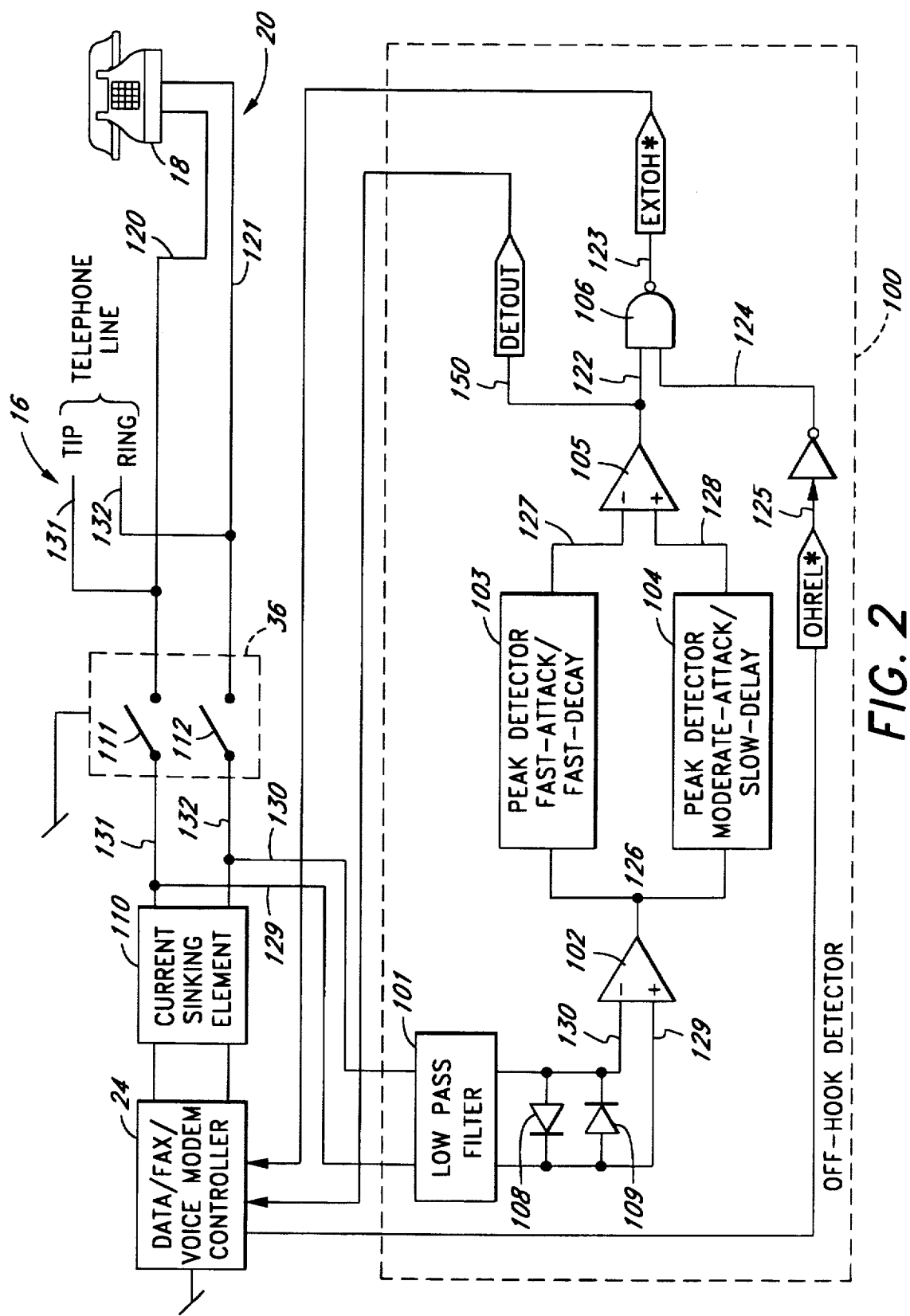
FIG. 2 is a block diagram, partially in schematic form, of a portion of the system of FIG. 1, showing, in particular, a circuit for detecting the off-hook status of the extension line.

Referring to FIG. 2, off-hook detector 100 is shown in block diagram form in combination with several of the functional units of FIG. 1. As can been seen from FIG. 2, telephone line 16 is composed of a pair of separate lines 131 and 132, with line 131 being a tip line and line 132 being a ring line. Extension line 20 is composed of a tip line 120 and a ring line 121. The tip line of extension line 120 is connected to the tip line of telephone line 16. Likewise, the ring line of extension line 20 is connected to the ring line of telephone line 16. Switch 36 is provided along tip and ring lines 131 and 132. Switch 36 includes a first switch 111 for tip line 131 and a second switch 112 for ring line 132.

Tip line 131 and ring line 132 are further connected to a current sinking element 110 which is connected to voice/data/fax modem controller 24. As noted above, switch 36 is controlled to take telephone line 16 off-hook in response to a received telephone call. Once switches 111 and 112 are closed, signals corresponding to an incoming telephone call are transmitted through current sinking element 110 into controller 24 for processing in the manner described above. As noted, controller 24 operates to determine whether an incoming telephone message contains data, fax or voice messages and initiates appropriate decoding and recording of the incoming message. Off-hook detector 100 operates to determine whether extension line 20 is taken off-hook to allow modem controller 24 to disable automated answering in the event that the incoming call is a voice telephone call.

Off-hook detector 100 is connected to tip and ring lines 131 and 132 via an additional pair of tip and ring lines, 129 and 130. As will be described in further detail below, detector 100 monitors a voltage difference between lines 129 and 130 and generates an output signal in the event of a significant change in the voltage difference. When extension line 120 is taken off-hook by manually lifting the receiver of telephone 118, an amount of current carried on telephone line 16 is affected due to an increase in the consumption of current caused by the operation of telephone 118. The reduction of current causes a decrease in a voltage difference between tip and ring lines 131 and 132, in part because of additional current passing along telephone line 16 to a central telephone office (not shown) and because of a reduction of current occurring at current sinking element 110 caused by a shunting effect resulting from the operation of extension phone 118. Thus, the detection of a substantial change in voltage between lines 131 and 132 provides an indication that extension line 120 has been taken off-hook.

Considering the voltages along the tip and ring lines in more detail, while switches 111 and 112 are open, i.e. the modem is on-hook, there is a zero volt difference between the voltages of tip and ring lines 131 and 132. However, once switches 111 and 112 are closed, i.e. the modem goes off-hook, an initial voltage differential appears between the tip and ring lines. The initial voltage differential is decreased if extension line 20 is subsequently taken off-hook.

The manner by which off-hook detector 100 detects changes in voltage along the tip and ring lines, will now be described with continued reference with FIG. 2. Off-hook detector 100 includes the following functional elements: a low pass filter 101, a differential-to- single-ended converter 102, a fast attack/fast decay peak detector 103, a moderate attack/slow decay peak detector 104, a comparator 105, and a NAND-gate 106.

Low pass filter 101 filters voltage signals received along tip and ring lines 129 and 130 to remove noise or alternating current signals such ._as voice signals. Differential to single ended converter 102 converts a differential voltage between tip and ring lines 129 and 130 to an absolute voltage relative to a ground. Peak detectors 103 and 104 monitor the absolute voltage signal output from converter 102. Peak detector 103 generates an output signal which responds very quickly to any changes in the absolute voltage output from converter 102. Peak detector 104 also generates an output signal which responds to changes in voltage of the absolute voltage signal. However, unlike peak detector 103 which responds quickly to a change in voltage, peak detector 104 responds very slowly to changes in voltage. Hence, peak detector 104 effectively operates as an averaging element for producing a time average voltage, whereas peak detector 103 operates to output a current or substantially instantaneous value of the absolute voltage.

Signals output from peak detector 103 and 104 are connected into inputs of comparator 105 which generates a logic output signal if the input voltages are substantially different. In other words, if the current voltage level output by peak detector 103 differs from the average voltage level output from 104, then comparator 105 generates a logic signal indicating that a substantial voltage change has occurred along tip and ring lines 131 and 132—an indication that extension line 20 has been taken off-hook. The logic value output from comparator 105 is identified as DETOUT. In FIG. 2 DETOUT is transmitted along an output line 150 which is connected to an input of controller 124. As can be appreciated, an active DETOUT signal is generated whenever a substantial change in voltage occurs between tip and ring lines 131 and 132.

As a practical matter, it may be desirable to generate a logic value only when a substantial change in voltage is detected while the modem is in the off-hook condition. To this end, an OHREL* logic signal is output from controller 24 along an output line 151. OHREL* provides an indication that modem 12 is in operation. OHREL* is inverted by an inverter 107 then connected via line 124 into NAND-gate 106. NAND-gate 106 also receives DETOUT signal output from comparator 105 along a line 122. NAND-gate 106 operates to logically combine the OHREL* and DETOUT logic signals to produce an EXTOH* logic signal. As can be appreciated, EXTOH* is only active when DETOUT and OHREL* are both active. In other words, output signal EXTOH* provides an indication that the extension line has been taken off-hook only if the modem is already off-hook. The EXTOH* signal is desirable since, for most applications, no signal need be generated if the extension is taken off-hook while the modem is on-hook. The EXTOH* logic signal is transmitted along a line 123 into controller 24 for use in controlling operation of modem 12 in response to the detection of the off-hook extension line. For many applications, separate DETOUT and EXTOH* output line need not both be provided. Rather, only one or the other signal need be output from detector 100.

In addition to the detector elements thus far described, detector 100 includes a pair of diodes 108 and 109 connected between tip and ring lines 129 and 130. Diodes 108 and 109 are included to provide a path for conduction of metallic surge fault currents which can occur within the detector. Diodes 108 and 109 are desirable for facilitating conformance with Federal Communication Commission (FCC) part 68 regulations.

The operation of detector 100 will be better understood with reference to FIG. 2 which provides a detailed schematic of a preferred implementation of detector 100. In FIG. 2, only those elements of overall system 10 which electrically interact with detector 100 are illustrated. These elements are illustrated using electrical schematic representations. For example, telephone 18 of FIG. 2 is illustrated as a resistor 213. Likewise, current sinking element 110 of FIG. 2 is illustrated as a resistor 210. For clarity and brevity, lines interconnecting NAND-gate 106 and comparator 105 to modem controller 24 are not repeated in FIG. 2.

Low pass filter 101 includes a set of four resistors 251, 252, 253 and 250 in combination with a pair of capacitors 254 and 255. Resistors 250 and 252 are in series along tip line 129. Resistors 251 and 253 are in series along ring line 130. Capacitors 255 and 254 are connected between tip and ring lines 129 and 130 and a ground respectively.

Comparator 102 of FIG. 2 comprises a current differencing amplifier, such as an LM3900 Norton amplifier, available from National Semiconductor Corporation, combined with a set of resistors, 274, 275, 256, 257 and a diode 258. Resistors 274 and 275 are connected between tip line 130 and a high voltage source of 5 volts. Resistor 256 is connected between ring line 129 and a ground. Resistor 257 is connected in parallel with amplifier 202. Diode 258 is connected to an output of amplifier 202. Finally, resistor 259 connects an output of diode 258 to a ground.

Diode, 258, provides a 1 Vbe (0.6 V0 level shift allowing the output of amplifier 202 (the cathode of 258) to swing close to ground. Resistor 259 (R259) is used to bias diode 258.

Peak detector 103, which provides a fast attack and a fast decay, is formed from a single diode 263, a capacitor 266 and a resistor 264. Diode 263 and resistor 264 are connected in series along a line 127. Capacitor 266 is connected between line 127 and a ground. Hence, peak detector 103 is implemented as an RC circuit. The resistance and capacitance values of resistor 264 and capacitor 266, respectively, are selected to provide a short RC time constant, such that a quick response to a change in voltage is achieved.

Peak detector 104, which provides moderate attack and slow decay, consists of a diode 260, a pair of resistors 261 and 265 and a capacitor 262. Diode 260, resistor 261 and resistor 265 are connected in series along a line 128. Capacitor 262 is connected between line 128 and a ground. Hence, peak detector 103 is also implemented as an RC circuit. The resistance and capacitance values of resistors 261 and 265 and capacitor 262, respectively, are selected to provide a long RC time constant, such that a slow response to a change in voltage is achieved.

Peak detector 104 operates to provide a self adjusting reference voltage against which the instantaneous voltage of peak detector 103 can be compared. The provision of peak detector 104 is desirable since voltage on the tip and ring lines may vary gradually as a function of time even though the extension line 20 is not taken off-hook. Furthermore, the average voltage difference between the tip and ring lines will likely depend on upon particular installation characteristics. For example, the voltage difference may depend upon the gauge of wires used as the tip or ring lines and may vary in accordance with a distance between system 10 and local telephone company equipment. Furthermore, the voltage difference may depend on the particular battery voltage employed to power the telephone circuits.

As noted above, detector 104 responds slowly to changes in voltage, to effectively provide a time average voltage which is used as a reference voltage for comparator 105. In this manner, detector 100 may be employed in any of a variety of installations wherein different voltage differentials between the tip and ring lines occur. Furthermore, the detector may be employed in circumstances where the tip and ring lines drift gradually with time.

Comparator 105 consists of a current differencing amplifier having a first input connected to line 127 and a second input connected to line 128, with line 128 providing a reference input. A diode 267 is connected to an output amplifier 205. A resistor 268 is connected in parallel with amplifier 205 and diode 267.

NAND-gate 106 and the various input and output logic signal lines are substantially as shown in FIG. 2, with the addition of a resistor 269 connected between DETOUT line 150 and a ground. Resistor 254 (R254) and resistor 255 (R255 provide common mode bias to amplifier 202 and allow tip and ring to be negative with respect to the circuits ground reference.

Figure 3:
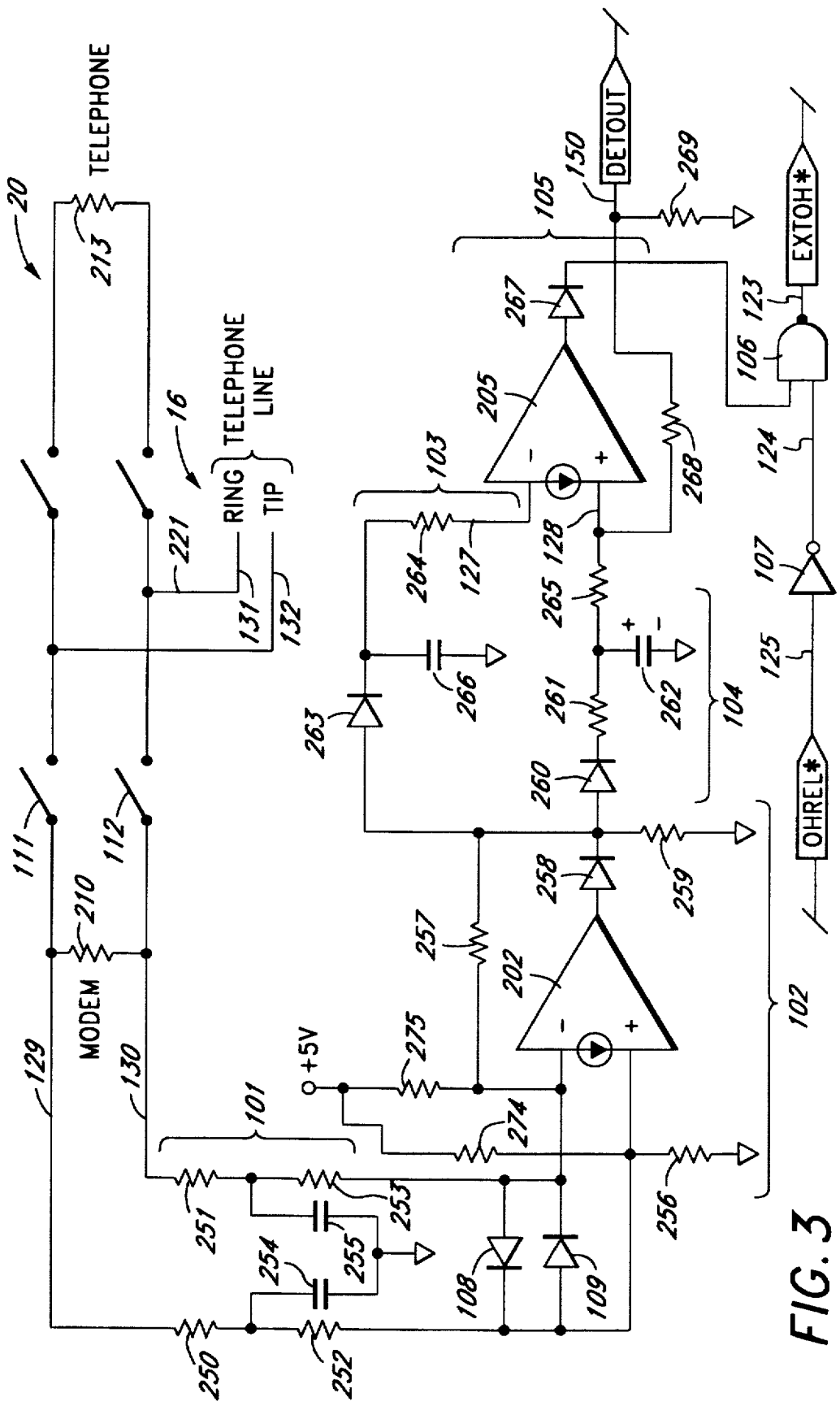
FIG. 3 is a schematic illustration of the detection circuit of FIG. 2.

The operational relevance of the electrical components identified above will now be further described with continued reference to FIG. 3. The filtered, scaled and ground referenced differential voltage between tip and ring is applied to the anodes of diode 260 and diode 263. Diode 263, resistor 264 (R264) and capacitor 266 C266) constitutes a fast attack/fast decay peak detector that drives the minus input of the comparator, 205. Diode 260, resistor 261 (R261), capacitor 262 (C262) and resistor 265 (R265) constitute a moderate attack/slow decay peak detector that drives the positive input of comparator 205. Resistor 268 (R268) provides hysteresis to ensure dominance of an output "high" state after a long period of time has passed since the triggering of 205. Capacitor 262 (C262) and capacitor 266 (C266) are at the same potential. The difference in value of resistor 265 (R265) and resistor 264 (R264) assures the initial dominance of the output "low" state and the combination of capacitor 262 (C262), capacitor 266 (C266), resistor 261 (R261), resistor 265 (R265), resistor 264 (R264), and resistor 268 (R268) set the thresholds for comparator 205's on and off states. Diode 267 provides a level shift for the output of comparator 205 so the cathode of diode 267 can swing close to ground. Resistor 269 (R269) provides bias for diode 267.

Electrical characteristics and parameters of the circuit of FIG. 2 will now be described with reference to some exemplary parameters. In general, low pass filter network 101 provides a corner frequency of:

$$f = \frac{1}{2\pi RC}$$

where:

$$R = \frac{(R250)(R252)}{R250 + R252}$$

or $$R = \frac{(R251)(R253)}{R251 + R253}$$

The foregoing calculation assumes the source impedance of tip (or ring) and the input impedance of amplifier 202 are relatively low compared to several megaohms.

$$f = \frac{1}{2\pi(2.56 \times 10^6)(.01 \times 10^{-6})} = 6.2 \text{ HZ}$$

A gain of the differential amplifier is determined by resistor 250 (R250) +resistor 252 (R252) and resistor 256 (R256) and resistor 251 (R251)+resistor 253 (R253) and resistor 257 (R257).

where R250=R251=R252=R253 and R256=R257

$$Av = \frac{R256}{R250 + R252}$$

or $$Av = \frac{R257}{R251 + R253}$$

As an example, $$Av = \frac{6.8 M}{5.6 M + 4.7 M} = 0.66$$

The gain can be selected or scaled to accommodate an anticipated range of differential voltages between top and ring lines, 129 and 130 with appropriate choice of resistance values. If the amplifiers are powered from a 12 V supply, scaling the signal is not as critical as it may be if the power supply is limited to +5 V. The amplifier maximum output voltage is approximately 4 V with a +5 V power supply and 11 V on a +12 V supply. The dynamic range of the amplifiers and therefore this circuit is much greater when it is powered from a +12 V supply.

As can be appreciated, operational characteristics of the circuitry of FIG. 3 can be selected with the appropriate choice of resistance and capacitance values and with the appropriate choice of particular amplifiers. The exemplary values listed above are merely illustrative and do not necessarily represent an optimal choice.

Referring to FIG. 4, an alternative embodiment of the common mode bias for amplifier 202 of FIG. 2 is illustrated. The alternative circuit allows for the adjustment of off-sets caused by differences in the values of resistors 254 and 255 of FIG. 2. The common mode bias of FIG. 4 provides three resistors 354, 355 and 380, rather than the two resistors 254 and 255 of FIG. 2. Resistor 380 is a variable resistor connected directly to a 5 volt power source via line 381. Resistors 354 and 355 are connected in parallel to opposing ends of resistor 380. The network of FIG. 4 may be used to replace resistors 254 and 255 of the circuit of FIG. 3, with lines 329 and 330 of FIG. 4 connected to appropriate terminals within the circuitry of FIG. 3.

FIGS. 5a and 5b illustrate alternative embodiments of the NAND-gate circuitry of FIG. 3. FIG. 5a illustrates that a differential amplifier may be employed rather than a NAND-gate. In the embodiment of FIG. 5a, a DETOUT signal and the OHREL* signals are transmitted through resistors 404 and 405, respectively, into a pair of input terminals of a current differencing amplifier 401 such as the one of FIG. 2. Output of amplifier 401, represented by logic value EXTOH* is transmitted through a diode 402 on an output path 415 for transmission to modem controller 24 (FIG. 2). A resistor 403 is connected between an output line 415 and a ground. As can be appreciated, the sub-circuit of FIG. 5a operates in the same functional manner as the NAND sub-circuit of FIG. 3 to generate an output signal EXTOH* which is only active if both DETOUT and the OHREL* are active.

FIG. 5b illustrates a combinatorial circuit employing a transistor 425. DETOUT signal is received along an input line 422 transmitted through a resistor 428 into a gate of transistor 425. A resistor 427 is connected between line 422 and a ground. An emitter of transistor 425 receives a signal OHREL* along line 225. Output signal EXTOH* is output through a collector of transistor 425. The collector is connected via a resistor 426 to a five volt power source. As with the alternative configuration of FIG. 5a, the configuration of FIG. 5b operates to combine signals DETOUT and OHREL* to produce a signal combined output signal EXTOH* which is active only if DETOUT and OHREL* are both active. In other words, EXTOH* is active only if extension line 20 (FIG. 2) is taken off-hook while modem 12 is on-hook.

The various circuits illustrated in the foregoing figures may be fabricated and constructed in accordance with conventional technology. Preferably, a large portion of detector circuit 100 is fabricated using integrated circuit technology. In particular, all elements of detector 100, except for low pass filter 101 and diodes 108 and 109 are preferably fabricated as a single integrated circuit with pin outs for connecting to modem controller 24. The particular detector circuit configuration shown in the figures is illustrative of a preferred embodiment of the invention. Other circuit configuration may be employed, consistent with the principles of the invention to achieve a signal indicative of whether an extension line is taken off-hook. The detector circuit may be employed with a conventional data/fax/voice modem. Of course, the conventional voice/data/fax modem may require reprogramming or reconfiguration in order to receive and process the output logic signals generated by detector 100.

Although the detector circuit may be employed with any of a variety of modems employing various internal circuitry, the detector circuit is preferably used in combination with a CL-MD9624AT or a CL-MD9624ET2 Modem both provided by Cirrus Logic, Inc. of Fremont, Calif., the assignee of rights to the present invention. The foregoing modems employ an intelligent voice/data/fax modem device set which can be conveniently programmed using an AT instruction set to receive and process the logic output signals, output be detector 100. Details of the function and operation of the CL-MD96248AT/EC2 Modems, though not necessary for understanding the present invention, are available in a CL-MD9624AT/EC2 data book available from Cirrus Logic, Inc. of Fremont, Calif. 94538.

Furthermore, although advantageously employed with a voice/data/fax modem, the detector circuit described herein may also be employed with a wide variety of other automated telephone answering devices such as facsimile machines, modems, answering machines and alike. Advantages of the invention may be achieved in any application where it is desirable to determine whether an extension line is taken off-hook. Further, although described with reference to only a single extension line, the invention may be exploited in an environment having multiple extension lines. Also, it should be noted that the extension phone need not be operated while its off-hook status is being detected. Rather, the extension phone need only draw a sufficient amount of current to affect the voltage on the telephone line by a detectable amount. Preferably, after the modem is disconnected, the extension phone is biased up normally, for full operation.

Also, it should be noted that most modern telephones require between 10 ma and 40 ma and approximately 3.5 V to 5 V between tip and ring (the two wires that constitute the telephone line) to operate properly. Some speaker phones may require 10 V to operate properly. The voltage drop across the tip and ring terminals of the telephone lines with the modem in the active (connected or off-hook state) is determined by the telephone company line voltage, wire gauge and the impedance of the current sinking element of the modem. The voltage drop across a data access arrangement (DAA) of a modem that uses the primary winding of a transformer as the loop current sinking element (often referred to as a "wet" DAA) is typically very low since it is determined primarily by the transformer primary resistance. An active current sinking element (often referred to as a "gyrator" or a "dry" DAA), on the other hand, can be designed to have a higher effective impedance than a "wet" DAA and still meet the "under 200 Ohm" FCC requirement. This higher impedance will develop a higher tip-ring voltage when the modem is off-hook providing a more effective bias for the extension phone and a larger voltage change on tip and ring when the extension phone is connected in parallel with the modem on tip and ring. This will allow the extension off-hook detect circuit to operate more predictably with a wider variety of telephones.

While preferred and alternative embodiments of the present invention have been disclosed and described in detail herein, it will be apparent to those skilled in the art that various changes in form and detail may be made therein without departing from the spirit and scope thereof.

I claim:

1. A device for answering a telephone call received along a telephone line having at least one extension line, said device comprising:

means, connected to the telephone line, for answering an in-coming telephone call received along the telephone line;

means for determining whether the in-coming call contains a data message or a voice message;

means for recording a portion of the voice message in response to a determination that the incoming call contains a voice message;

means for detecting an off-hook condition on said extension line by detecting a change in voltage on said telephone line caused by said extension line being taken off-hook, said means for detecting comprising:

a voltage peak detector having a slowly-varying response for generating a signal representative of an average voltage occurring on said telephone line;

a voltage peak detector having a quickly-varying response for generating a signal representative of a current voltage along said telephone line; and a voltage comparator having first and second inputs connected to said voltage peak detector having a slowly-varying response and said voltage peak detector having a quickly-varying response for comparing said signals representative of said current voltage and said average voltage and for detecting a difference between said current voltage and said average voltage; and means, operative in response to the detection of an off-hook condition, for terminating operation of said means for recording the voice message.

2. The device of claim 1, further including means for recording a data message in response to a determination that the incoming call contains a data message.

3. The device of claim 2, wherein said means for recording data includes means for recording facsimile data.

4. The device of claim 1, wherein said means for answering an in-coming telephone, said means for determining whether the in-coming call contains a data message or a voice message, and said means for recording a portion of the voice message together comprise a voice/data/fax modem connected to a memory device.

5. The device of claim 1, wherein said means for determining an off-hook condition further includes means for combining a signal received from said voltage comparator with a signal representative of whether said means for answering an in-coming telephone call received along the telephone line is operational, such that an output signal is generated only if said extension line is off-hook while a telephone call is being received.

6. The device of claim 1, wherein said telephone line includes tip and ring lines and said means for detecting a change in voltage on said telephone line detects a change in a voltage difference between said tip and ring lines.

7. The device of claim 1, wherein said means for determining whether said extension line is off-hook includes a low pass filter means for filtering a voltage signal received from said telephone line.

8. The device of claim 1, wherein said telephone line includes tip and ring lines and wherein said means for determining whether said extension line is off-hook includes means for converting a voltage difference between said tip and ring lines into an absolute voltage relative to a ground.

9. A telephone answering device for answering a telephone call received along a telephone line having at least one extension line, said telephone line including tip and ring lines, said device comprising:

a memory;

voice/data/fax modem means, connected to the telephone line and to said memory, for answering a telephone call received along said telephone line, for determining whether a message received along said telephone line contains a data message or a voice message, for recording said data message in said memory, if said message contains data and for recording a voice message in said memory, if said message is a voice message;

means for detecting an off-hook condition on said extension line by detecting a change in voltage on said telephone line caused by said extension line being taken off-hook, said means for detecting comprising:

converter means for converting a voltage difference between the tip and ring lines into an absolute voltage signal relative to a ground;

first voltage detection means for generating a signal representative of an average voltage said first voltage detection means having a slowly-varying response;

second voltage detection means for generating a signal representative of a current voltage, said second voltage detection means having a quickly-varying response; and means for comparing said signals representative of said current voltage and said average voltage and for detecting a difference between said current voltage and said average voltage; and means, operative in response to the detection of an off-hook condition, for terminating operation of said means for recording a voice message, if said input message is voice.

10. The device of claim 9, wherein said first voltage detection means comprises a voltage peak detector characterized by a fast attack and a fast decay.

11. The device of claim 9, wherein said first voltage detection means comprises a voltage peak detector characterized by a moderate attack and a slow decay.

12. The device of claim 9, wherein said means for comparing said current voltage with said average voltage and for detecting a difference between said current voltage and said average voltage comprises:

a voltage comparator having first and second inputs connected to said means for generating a signal representative of an average voltage and said means for generating a signal representative of a current voltage, respectively.

13. The device of claim 9, further including a low pass filter means, connected between the tip and ring lines and the converter means, for filtering voltage signals received from said tip and ring lines.

14. A device for answering a telephone call received along a telephone line having at least one extension line, said device comprising:

means, connected to the telephone line, for answering an in-coming telephone call received along the telephone line;

means for determining whether the in-coming call contains a data message or a voice message;

means for recording a portion of the voice message in response to a determination that the incoming call contains a voice message;

means for detecting an off-hook condition on said extension line by detecting a change in voltage on said telephone line caused by said extension line being taken off-hook, wherein said means for detecting a change in voltage on said telephone line comprises:

a low pass filter means for filtering a differential voltage signal received from said telephone line;

voltage conversion means, connected to said low pass filter, for converting a filtered differential voltage signal to an absolute voltage relative to a ground;

a voltage peak detector having a slowly-varying response, connected to an output of said voltage conversion means, for generating a signal representative of an average of said absolute voltage;

a voltage peak detector having a quickly-varying response, connected to said output of said voltage conversion means, for generating a signal representative of a current voltage value of said absolute voltage; and a voltage comparator having first and second inputs connected to said means for generating a signal representative of an average voltage and said means for generating a signal representative of a current voltage, respectively for comparing said signals representative of said current voltage and said average voltage and for detecting a difference between said current voltage and said average voltage;

means, operative in response to the detection of an off-hook condition, for terminating operation of said means for recording the voice message.

15. A device for answering a telephone call received along a telephone line having at least one extension line, said device comprising:

a memory;

a modem, connected to the telephone line, for answering an in-coming telephone call received along the telephone line, the telephone line including tip and ring lines, said modem determining whether the in-coming call contains a data message or a voice message and recording a voice message in said memory, if the incoming call contains a voice message; and an off-hook detector, operably connected to said telephone line and to said modem, said off-hook detector detecting an off-hook condition on said extension line by detecting a change in voltage on said telephone line caused by said extension line being taken off-hook and transmitting a signal representative of said off-hook condition to said modem, said modem terminating the recording of the voice message in response to the detection of an the off-hook condition on said extension line, wherein said detector comprises:

a low pass filter connected to said tip and rings lines;

a differential voltage-to-absolute voltage converter, connected to an output of said low mass filter, said converter converting a voltage difference between said filtered tip and ring lines to an absolute voltage relative to a ground;

a first voltage peak detector, connected to an output of said differential-to-absolute voltage converter, said first voltage peak detector having slowly-varying response;

a second voltage peak detector, connected to an output of said differential-to-absolute voltage converter, said second voltage peak detector having a quickly-varying response; and a comparator, connected to outputs of said first and second voltage peak detectors, said comparator generating a signal if an output signal from said first voltage peak detector differs substantially from an output of said second voltage peak detector.

16. The device of claim 15, wherein said modem records a data message in said memory, if said incoming call contains a data message.

17. The device of claim 15, wherein said detector further includes a NAND gate connected to an output of said voltage comparator and a signal line carrying a signal representative of whether said modem is operating to receive a telephone call, said NAND gate outputting a active control signal only if said extension line is off-hook while a telephone call is being received.

18. A method for processing a telephone call received along a telephone line having at least one extension line, said telephone line including tips and ring lines, said method comprising the steps of:

answering an in-coming telephone call received along the telephone line;

determining whether the in-coming call contains a data message or a voice message;

recording a portion of the voice message in response to a determination that the incoming call contains a voice message;

detecting an off-hook condition on said extension line by detecting a change in voltage on said telephone line caused by said extension line being taken off-hook said detecting step comprising the steps of:

converting a voltage difference between the tip and ring lines into an absolute voltage signal relative to a ground;

generating a signal representative of an average voltage;

generating a signal representative of a current voltage; and comparing said signals representative of said current voltage and said average voltage and detecting a difference between said current voltage and said average voltage; and terminating the recording of the voice message in response to the detection of the off-hook condition.

\* \* \* \* \*

UNITED STATES PATENT AND TRADEMARK OFFICE
CERTIFICATE OF CORRECTION

PATENT NO. : 5,506,891
DATED : April 9, 1996
INVENTOR(S) : Brown et al.

It is certified that error appears in the above-indentified patent and that said Letters Patent is hereby corrected as shown below:

In column 6 at line 41, please delete " ._ ".

Signed and Sealed this

Tenth Day of December, 1996

Attest:

BRUCE LEHMAN

*Attesting Officer*     *Commissioner of Patents and Trademarks*